United States Patent
Orozco et al.

(10) Patent No.: US 7,107,118 B2
(45) Date of Patent: Sep. 12, 2006

(54) LASER WELDING CONTROL SYSTEM

(75) Inventors: Nelson J. Orozco, Wells, ME (US);
Paul A. Blomquist, Sanford, ME (US);
Kendrick H. Light, Gorham, ME (US);
Robert B. Rudy, Limerick, ME (US);
Steven R. Webber, Springvale, ME (US)

(73) Assignee: Applied Thermal Sciences, Inc., Sanford, ME (US)

( * ) Notice: Subject to any disclaimer, the term of this patent is extended or adjusted under 35 U.S.C. 154(b) by 98 days.

(21) Appl. No.: 10/860,687

(22) Filed: Jun. 3, 2004

(65) Prior Publication Data
US 2004/0249495 A1 Dec. 9, 2004

Related U.S. Application Data

(60) Provisional application No. 60/475,565, filed on Jun. 3, 2003.

(51) Int. Cl.
*G06F 19/00* (2006.01)

(52) U.S. Cl. ............. 700/166; 219/121.61; 219/121.83

(58) Field of Classification Search ................ 700/166; 219/121.63, 121.61, 121.83; 29/454
See application file for complete search history.

(56) References Cited

U.S. PATENT DOCUMENTS

| | | | | | |
|---|---|---|---|---|---|
| 5,272,312 | A | * | 12/1993 | Jurca | 219/121.83 |
| 5,283,416 | A | * | 2/1994 | Shirk | 219/121.83 |
| 5,651,903 | A | * | 7/1997 | Shirk | 219/121.64 |
| 6,040,550 | A | * | 3/2000 | Chang | 219/121.63 |
| 6,262,387 | B1 | | 7/2001 | Chang | |
| 6,531,675 | B1 | | 3/2003 | Faitel | |
| 2004/0133298 | A1 | * | 7/2004 | Toyserkani et al | 700/166 |

* cited by examiner

*Primary Examiner*—Leo Picard
*Assistant Examiner*—Douglas S. Lee
(74) *Attorney, Agent, or Firm*—Patricia M. Mathers; Thomas L. Bohan (57) ABSTRACT

A fully integrated automated laser weld process control system (LWPCS) and method of controlling the fabrication of structural parts, particularly for shipbuilding and other industries. The LWPCS defines joint and weld quality attributes as process control variables and integrates these weld quality variables, along with the more traditional process parameters such as laser power, wire feed, GMAW voltage and active seam tracking, into a closed-loop monitoring and control system. The LWPCS includes a central processor and a plurality of subsystems that control laser beam positioning, vision-based monitoring and image processing, active weld-quality monitoring and inspection, adaptive beam delivery, and seam tracking. Cross-communication between subsystems is managed by the central processor. In addition to process control, the system extracts weld quality attributes during the weld process and provides immediate documentation of the weld quality.

25 Claims, 3 Drawing Sheets

LASER WELDING CONTROL SYSTEM

STATEMENT REGARDING FEDERALLY SPONSORED RESEARCH

The present invention was made with Government support under Contract #: N00014-01-C-0355, awarded by the Office of Naval Research. Accordingly, the Government has certain rights in the invention.

FIELD OF THE INVENTION

The invention relates to the field of welding. More particularly, the invention relates to a process control system for controlling GMAW-assisted laser welding of fabricated parts.

BACKGROUND INFORMATION

Parts that are used on naval ships must meet high quality standards and preferably be as light in weight as possible. Certain structural shapes are typically fabricated by such methods as deflanging or splitting hot-rolled I-beams. Use of hot-rolled sections has certain inherent disadvantages with regard to product quality. For one, the tolerance range is wide, requiring that many parts fabricated from these shapes be reworked. For example, hot-rolled I-beams are often split in two to obtain T-beams. The position of the flange relative to the web varies widely on hot-rolled I-beams, which may require that the T-beam be reworked. For another, the distortion on the parts resulting from working the material can be unacceptably great, which, again, requires that the part be reworked or compensatory measures taken when the hot-rolled section is assembled. Reworking of parts increases considerably cost and fabrication time of parts.

In addition to the disadvantages mentioned above, the use of hot-rolled sections limits the designer to certain sizes and shapes, thereby resulting in a higher weight product. Hot-rolled structural parts are made in standard sizes and shapes, with large jumps in dimensions between sizes. The structural requirements of a part may allow the design of a part that has dimensions that lie between two sizes of conventional parts. Since it is not acceptable to use a part with strength and rigidity properties that are lower than specified, the larger size must be used, resulting in a part that is dimensionally greater and stronger than necessary. The difference in dimensions most certainly adds unnecessary weight to the structure.

The use of hot-rolled structural sections also limits the types of material used. Most hot-rolled structural shapes or parts for shipbuilding are made from AH36 material. Higher strength steels (HSLA 65, 80, or 100) are available in plate stock only. The use of these higher strength steels would allow the structural parts to be designed to smaller dimensions, which would result in a significant reduction in weight.

The conventional deck on a ship is constructed from steel plates, with T-beams welded to the plates to provide additional stiffness. With conventional welding systems, it is difficult to control dimensional tolerancing and distortion. Secondary processes are then applied to the welded structure to eliminate the distortion. This is typically done by applying heat to the distorted parts, which may result in higher residual stresses in the parts. The necessity of applying these secondary processes raises the cost of the structure in terms of both time and cost.

It is possible to construct the deck as a composite structure, using two much thinner steel plates of high strength steel, with a corrugated structure sandwiched between them, then welding T-beams to the structure to add stiffness. It is estimated that the use of such a composite construction for the decks of a ship would result in up to 50% overall weight savings of the ship. The difficulty today with employing such construction methods lies in the seam tracking and weld quality control systems. Conventional laser-welding systems that could weld a T-beam do not have a comprehensive process control and integrated weld quality inspection system that provides feedback and weld control during the weld process. It is known in laser welding systems to use a seam tracker to guide the laser beam along the weld seam, but the inspection systems are not coupled into the weld control processes. In other words, they don't feed data back to control the process. Such control could correct processes that are going off-specification, before it is too late and a deficient weld has been completed. With conventional laser welding systems, the inspection is a separate offline process, that is, the welded parts are transported to an inspection station offline, where the final weld inspection and secondary processes are applied.

The difficulty of controlling the quality of a weld is magnified when welding large structural parts. With complex three-dimensional shapes, the errors are also three-dimensional and are accordingly very difficult to properly measure and correct.

What is needed, therefore, is a system for and a method of fabricating structural parts that significantly reduce the amount of rework. What is further needed are such a method and a system for fabricating such structural parts from plate stock, rather than hot-rolled sections. What is yet further needed is such a system that enables integration of the weld process with other systems.

BRIEF SUMMARY OF THE INVENTION

For the reasons cited above, it is an object of the invention to provide a laser weld process control system for and method of fabricating structural parts that increase the reliability of the fabrication process and reduce significantly the amount of rework. It is a further object to provide such a method and system that enable the fabrication of structural parts from plate stock. It is a yet further object of the invention to provide such a system and method that enable integration of the weld process with other systems.

The invention of the present application is a laser-weld process control system (LWPCS) and a method for controlling gas-metal-arc welding (GMAW)-assisted laser welding. The LWPCS is a modular system comprising a plurality of control modules or subsystems. These subsystems include a central processor (CP), a laser device controls subsystem (LDCS), an adaptive beam delivery subsystem (ABDS), an optically-based seam tracking subsystem (STS), an optically-based active weld quality monitoring and control subsystem (AWQMS), and a vision-based weld pool monitoring system (WPMPS). These subsystems are independently controlled by programmable logic controllers (PLCs) or by their own embedded processors. The subsystems and various control devices are commercially available products, as is the CP. The inventive features of the LWPCS and the method reside in the degree of integration of the subsystems into a comprehensive laser-weld process control system with cross-communication between all subsystems, system feedback, closed-loop control, and operator intervention capability throughout the weld process.

The heart of the LWPCS is the CP, which manages cross-communication in real-time between the various independent systems, defines the weld-process parameters, adjusts the process parameters as needed, based on input from the other subsystems, in real-time, and also includes a set of customized graphical user interfaces (GUI). The CP fully integrates the control and functionality of the various subsystems and, via the GUI, allows the operator to enter weld parameters and also to monitor and intervene in the ongoing weld process. The proprietary software governing the CP comprises modularized source code that facilitates modifications to the system, including the addition of other subsystems, and an analog and digital I/O for transmitting data to the GUI. The software also includes a parametric database that contains weld process parameters, based on part geometry and material type, and algorithms for adjusting the parameters. The CP analyzes data, adjusts process parameters, logs events, and generates a weld inspection report on the welded product. The weld inspection report includes a summary of the weld profile data, along with the information whether the part passes inspection or not. If it does not pass inspection, the report indicates the location(s) and type(s) of weld defects.

The CP selects the initial process parameters from the parametric database, based on the parameter inputs from the operator or the external interface that are specific to the particular weld geometry and material of the part to be welded, and, throughout the weld process, adjusts process parameters in real-time, based on inputs from the seam tracker and weld quality monitoring subsystems and on algorithms contained in the parametric database.

Key components of the LWPCS according to the invention are the WPMPS, the AWQMS, STS and the ABDS. The STS is an optical joint-tracking subsystem; the ABDS delivers the laser beam to the weld joint and both comprise a system of optical elements and mirrors. The ABDS also controls certain parameters of the laser beam, such as laser focal spot size. The STS uses the principle of laser triangulation and comprises an optical system with a CCD or a CMOS-based camera, as well as its own internal laser source from a 2-D laser diode that the seam tracker uses to "paint" a laser line (stripe) along the joint to be welded. The resulting reflected scattered light is imaged onto the CCD or CMOS camera sensor. The digitized signals from the camera sensor are transmitted to an embedded processor within the STS where image processing algorithms extract joint profile data. Based on this joint profile data, the precise location of the "theoretical" joint and the dimensions of a gap, if there is one, between the parts to be welded are calculated. For example, the cut edge of a part to be welded to another part is not always precisely flat. As a result, when the two parts are brought together, areas of gap and no-gap exist along the seam. The STS feeds the gap information back into the CP, which adjusts process parameters to a change in gap. For example, with increasing gap size, the CP slows the process speed or increases the wire feed.

The quality monitoring and inspection subsystems, AWQMS and WPMPS, are vision-based and communicate directly with the CP and allow the operator to monitor the weld process. Both subsystems are equipped with a CMOS camera and the AWQMS is also equipped with a laser device. The AWQMS uses the same principle of laser triangulation as the STS to "paint" a laser line (stripe) along the welded joint. The camera records the reflected scattered light and extracts the weld profile data. As mentioned above, the STS measures gap and joint location, the AWQMS, on the other hand, based on the measured weld profile data, calculates fillet size, any undercut or overcut, and detects the presence of porosity, or cracks. The WPMPS is a vision-based subsystem that looks at the weld pool and analyzes the volumetric and internal integrity of the weld. Data from the monitoring and inspection subsystems, AWQMS and WPMPS, are relayed to the CP for further processing and analysis. If necessary, the CP allows the operator to take corrective action remotely from the operator station via the GUI.

Each subsystem is in direct communication with the CP. In addition, the STS and the ABDS are also in direct communication with each other by means of a digital and an analog I/O. This high degree of integration between the various subsystems and the CP ensures proper sequencing and control of the weld operations, enables close monitoring of the weld quality, and provides fast-response seam tracking and real-time control of laser beam delivery to the joint. A real-time controller is responsible for integrating data from the seam tracker into the ABDS for correcting the weld. The STS measures the gap, and correspondingly the CP adjusts the parameters, such as the process speed, wire feed, GMAW voltage and/or laser power to accommodate the gap size. This ability to adjust the weld parameters in-process avoids having to rework an undercut weld on a finished part after the completion of the system-controlled weld process.

The LWPCS is a process control system for a hybrid laser-GMAW weld process, hereinafter referred to simply as hybrid weld process. The hybrid weld process allows for much faster process speeds, with much less excess heat when compared to a pure GMAW process, and enables precise welding of shapes at speeds of greater than 100 inches/minute, with real-time on-line weld-quality monitoring and inspection. The addition of the laser-weld process to the GMAW process means that higher welding speed means that less heat is put into the part to be welded, which means less excess heat and a more energy efficient process. Excess heat is the main cause of distortion and, thus, less excess heat means less distortion of the part to be welded. The metallurgical process limits speed of the weld process. A hybrid-laser welding system, such as the one according to the invention, is used to obtain better control of fillet geometry and is better able to accommodate joint gap between the web and flange to be welded. There is a certain correlation between the width of the laser weld beam and the width of a gap that can be effectively welded with the laser beam. For example, a laser beam which is small in diameter can not weld across a gap that is larger than the laser beam diamter. The hybrid weld process combines the advantages of the speed and accuracy of a laser weld process and the greater permissible gap dimensions of the conventional GMAW process. The fully integrated LWPCS, with its closed-loop feedback from the high-speed processors, plus the use of a laser welder to further increase the speed of welding, reduces the throughput time of the weld process significantly and, as a result, reduces the cost of a welded structural part.

The LWPCS according to the invention enables fabrication of parts to very close tolerances, reducing the amount of rework required when a welded part is manufactured. The LWPCS also enables the fabrication of unusual or irregular shapes, with a high degree of accuracy. One of the greatest advantages of laser fabrication of structural parts is that the structural parts can be designed with the optimal dimensions and strength properties (the ideal "design shape"). As a result, the fabricated part may be lighter in weight and more cost effective in terms of material and labor, than its hot-rolled counterpart. The reduction in weight is often significant. For example, a laser fabricated part, made of the same material as a hot-rolled section and meeting the same strength requirements, is approximately 20% lighter. The reduction in weight may be even greater when the parts are fabricated from plate stock of higher strength steels, such as HSLA-65 (up to 30 to 40% weight savings), or as a composite structure comprising two outer skins of higher strength steel and a sandwich portion of a corrugated material (up to 25% total weight savings). This option is not available for hot-rolled shapes. In addition to these advantages, laser welding is not limited to welding certain size parts and can effectively be used to weld any size part.

The LWPCS according to the invention allows high quality, high accuracy, hybrid laser-GMAW welds to be made with, for example, ½ inch HSLA-65, at speeds of 100 inches/minute or greater. The variety of shapes that have already been welded with the LWPCS according to the invention at speeds between 75 and 100 inches per minute includes T-beams up to 20 feet long, curved 8 foot beams, and custom 10 foot I-beams. It is expected that welds at speeds of up to 600 inches per minute are achievable with the LWPCS according to the invention. Seam tracking has been demonstrated at 400 inches per minute. By contrast, speeds for welding such parts with conventionally controlled processes are 10 to 40 inches per minute.

The LWPCS according to the invention is a fully integrated system that controls and monitors in real-time the quality and geometry of the weld in an operator-friendly system that allows the operator to set certain process parameters. This system may be used as a stand-alone system or integrated with other external systems, such as a materials handling system, thus providing a fully automated system that encompasses the materials handling and the welding operation.

DETAILED DESCRIPTION OF THE INVENTION

Figure 1:
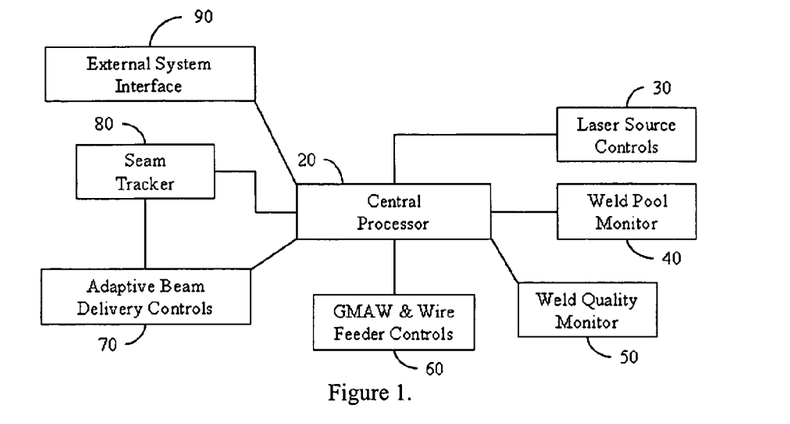
FIG. 1 is a schematic diagram illustrating the integration of the various subsystems of the modular laser welding control system according to the invention.

FIG. 1 is a block diagram of a laser welding control system (LWPCS) 10 according to the invention. The LWPCS 10 is a fully integrated system that comprises a central processor (CP) 20 and a plurality of subsystems. The CP 20 includes a graphical user interface (GUI) 25 and proprietary software that controls and regulates in real-time the various weld-process parameters. Included in this software is a parametric database that contains the various parameters and algorithms with which to control and/or modify the weld process. The subsystems include a laser device control subsystem (LDCS) 30, a vision-based weld pool monitoring and processing subsystem (WPMPS) 40, an active weld quality and monitoring subsystem (AWQMS) 50, a GMAW and wire feeder control subsystem (WFCS) 60, an adaptive beam delivery subsystem (ABDS) 70, and a seam tracking subsystem (STS) 80. Several of the subsystems are independently controlled by programmable logic controllers (PLCs) or by embedded processors. Each of the subsystems 30, 40, 50, 60, 70, 80 is in direct communication with the CP 20. The STS 80 and the ABDS 70 are also in direct communication with each other. The CP 20 handles all cross-communication between and among subsystems 30, 40, 50, 60, 70, and 80, and also the communication via the GUI 25 between the operator and the same subsystems.

FIG. 1 also illustrates integration of the LWPCS system 10 with an optional external system interface (ESI) 90. The CP 20 is sufficiently flexible and modularized, such that adding other systems as needed is easily done via the ESI 90 or directly to the CP 20. For example, it may be desirable to integrate the LWPCS system 10 with a materials handling system (MHS) that coordinates the delivery of plate stock, configures the plate stock to the appropriate configuration of plates for a part P, and receives the welded part P when the automatic weld process is completed. The MHS receives instructions via the ESI 90 to assemble and deliver the appropriate plates to the LWPCS system 10 for welding and inspection. Once the part is completely welded, the fabricated part P is then released back to the materials handling system via the ESI 90, for delivery to the next operation.

Figure 2:
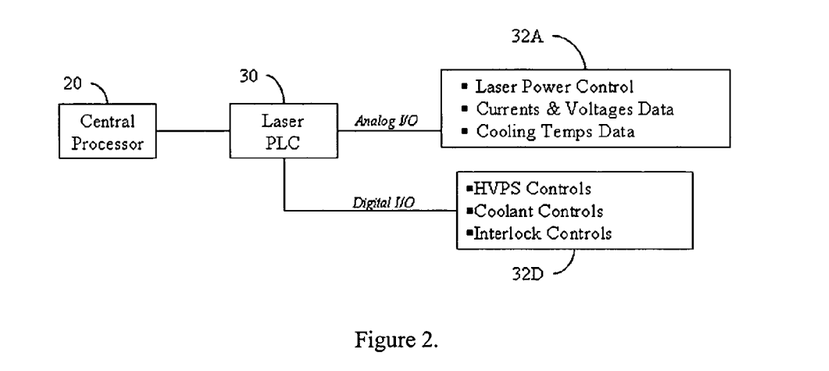
FIG. 2 is schematic diagram illustrating the integration of the various welding sensors and controls of the laser welding subsystem with the central processor.

FIG. 2 illustrates the integration of analog and digital sensors and controls 32A, 32D, respectively, into the LWPCS 10 via the LDCS 30 and the CP 20. Laser operations are sequenced and directed by the CP 20, though the control details are handled by a dedicated PLC. The communication link between the laser PLC and the CP 20 handles laser control requests from the CP 20 and laser operational data to the CP 20 and laser operational data from the LDCS 30 to the CP 20. Should there be a failure with the communication link, the LDCS 30 will operate independently to safely shut down the laser device. Operator control requests are transmitted from the operator via the GUI 25 to the LDCS 30. All of the laser's operational data, both digital and analog, are available to the operation via the GUI 25.

Figure 3:
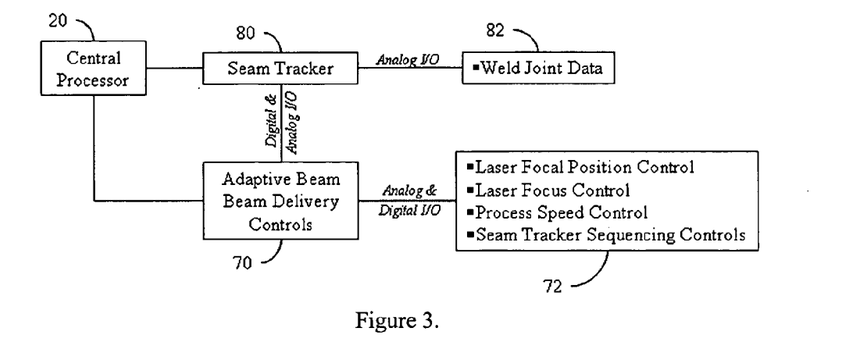
FIG. 3 is a schematic diagram illustrating the integration of the seam tracker subsystem and the adaptive beam delivery control subsystem with the control processor.

FIG. 3 illustrates the integration of the STS 80 and the ABDS 70 into the LWPCS 10 according to the invention. Analog data from an optical sensor 82, a component of the STS 80, is converted to joint geometry data by an embedded processor within the STS 80. The STS 80 comprises an optical system with a CMOS-based camera. At the initialization step started by the CP 20, the STS 80 locates the joint and sends the appropriate signals to the ABDS 70, which includes controls 72 for laser focal position, process speed, and sequencing of seam tracker. Once these controls 72, 82 bring the focal point of the laser beam and the MIG torch into the correct position on the weld seam, a "ready" signal is sent to the CP 20. The STS 80 "paints" a laser line LL (stripe) along the joint to be welded from its own internal laser source. The camera sensor digitizes the coordinates of the laser line LL, and, based on algorithms, calculates the geometry of the joint to be welded which includes precise location of the "theoretical" joint and the dimensions of a gap between the parts to be welded, if there is one. This joint geometry data is then used by the STS 80 and the ABDS 70 to precisely control the position of the laser focal point. Joint data from the STS 80 is read by the CP 20 and, based on this data, if necessary, the CP 20 makes adjustments to the weld-process parameters. Analog and digital controls for the weld process speed are directly controlled by the ABDS 70, with input from the CP 20.

Figure 4:
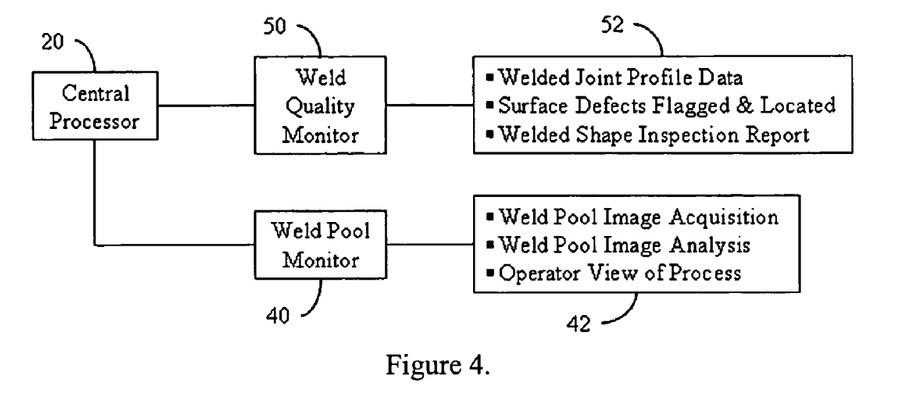
FIG. 4 is a schematic diagram illustrating the integration of the weld quality montor subsystem and the weld pool monitor subsystem with the central processor.

FIG. 4 illustrates the integration of the AWQMS 50 and the vision-based WPMPS 40 into the laser welding system 10. The AWQMS 50 utilizes the same technology and similar algorithms as the STS 80 to measure the weld joint profile and to detect weld-surface defects. Analog weld profile data 52, measured by the AWQMS 50, containing two-dimensional geometry information as a function of a longitudinal position of the weld as measured by the AWQMS 50 is fed to the CP 20. The weld profile data 52 includes, weld fillet size, fillet convexity or concavity, undercut size, if there is one, size of any cracks present, and porosity (if any) data. Based on the weld profile data 52, the CP 20 decides whether adjustments to any of the weld process parameters are needed. If such parameters, indeed, are needed, the CP 20 is responsible for making the appropriate changes to the weld process parameters. The CP 20 then flags the location of surface defects and includes these in an inspection report for each part as the weld is completed.

The WPMPS 40 is a vision-based system that looks at the weld pool and, based on the measurement of the weld pool, determines volumetric and internal integrity of the weld and allows the operator to review the process. Though the components are purchased, the algorithms to determine volumetric and internal integrity of the weld are provided in the proprietary software used to operate the LWPCS 10. As shown, the WPMPS 40 acquires in real-time an image of the weld pool and, based on image analysis routines, weld pool data 42 containing subsurface weld information, such as penetration depth, presence of internal voids or pores is fed to the CP 20. Based on this volumetric and internal integrity data, the CP 20 decides whether adjustments to any of the weld-process parameters are needed. A summary of the analysis from the WPMPS 40 is also included in the weld inspection report.

Figure 5:
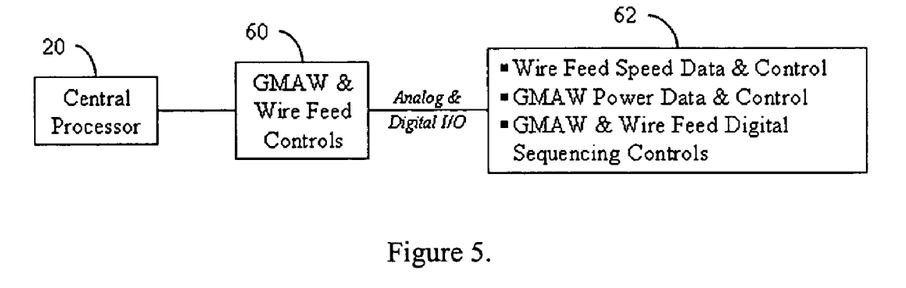
FIG. 5 is a schematic diagram illustrating the integration of the GMAW and WFC subsystems.

FIG. 5 illustrates the integration of the GMAW and WFCS 60 into the LWPCS 10 and the type of data that is exchanged between the GMAW and WFCS 60 and the CP 20. The GMAW and wire feed controls include analog and digital signals from a wire feed speed data and control, a GMAW power data and control, and one or more GMAW and wire feed digital sequencing controls. Based on the materials and shape to be welded, the CP 20 takes data from the parametric database to initialize the GMAW and wire feed process parameters. The CP 20 analyzes data from the STS 80, WPMPS 40 and AWQMS 50 and, if any process parameter adjustments are needed, the new values are fed to the GMAW and wire feed system 60.

Process control parameters are provided as set points in the various subsystems 30,40,50,60,70,80 and include such parameters as a start/stop transient control, weld-joint geometry, weld speed, wire feed speed, GMAW power, plasma suppression gas flow, and weld quality. The control parameters of the weld-joint geometry include real-time seam tracking, focal spot location, focal spot size, and joint-to-laser beam centerline relative angle. Sensors record in real-time process variables for the LDCS 30, the WPMPS 40, the AWQMS 50, the GMAW and WFCS 60, the STS 80, and the ABDS 70. The LDCS 30 includes sensors and/or controls for: delivered laser power, high voltage power supply (HVPS) settings; and cooling temperatures and flows. The AWQMS 50 includes sensors to measure: joint location, joint geometry, including gap angle, and mismatch. The ABDS 70 includes sensors to measure weld speed and focal point position. The AWQMS 50 includes sensors to measure fillet geometric parameters including undercut, and size. Other weld parameters include wire feed speed, GMAW power, and gas flows.

The subsystems, as well as welding devices and optical sensors and devices, are commercially available devices. Although any suitable PC and operating software may be used, a standard PC with a MicroSoft Windows XP® operating system, and a real-time processor from National Instruments, are used as the CP 20. A Pilot-LW System with Mini-i60 Camera from Servo-Robot in Montreal, Quebec, Canada serves as the STS 80. The laser welder used is from Convergent Prima, Model 25 kW CO2, 4-Mod. The AWQMS is a Flexcel Unit with Poroscan Camera from Servo-Robot, Montreal, Quebec, Canada. The weld pool monitor in the WPMPS includes a video camera from Basler, model a602fc and an Image Acquisition System, Model CVS 1455 from National Instruments, Texas. The GMAW power source is an Inivision 456P power source and the wire feeder is model S/74S, both from Miller. This information is for illustrative purposes only and is not intended to limit the scope of the invention to these particular subsystems, components and/or devices.

Figure 6:
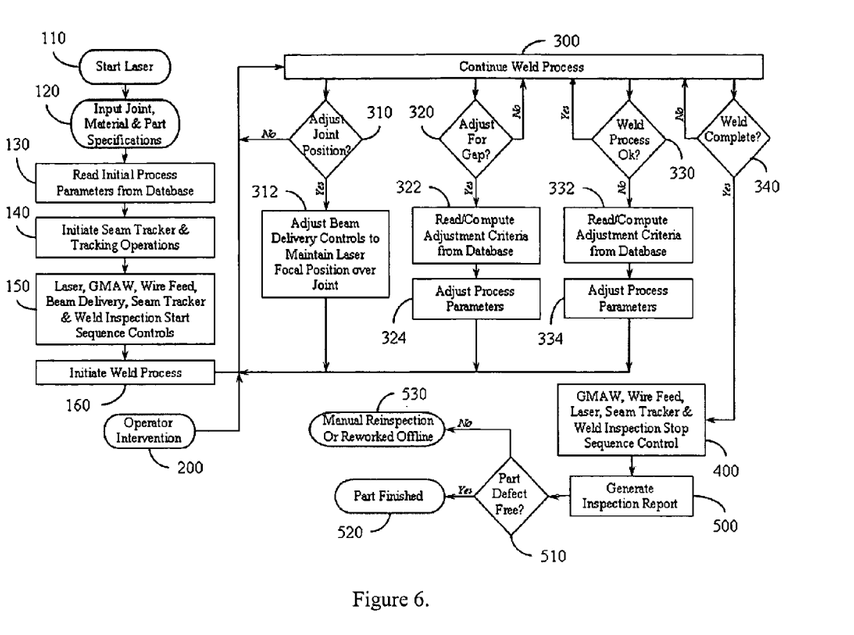
FIG. 6 is a flowchart, illustrating the method according to the invention of welding structural parts with the LWPCS.

FIG. 6 is a flowchart that illustrates a control method 1000 for a fully integrated laser weld process control system, using the LWPCS 10. The subsystems 30,40,50,60,70,80 and 90 include conventional sensors, devices, programmed logic technology, and apparatus, that are integrated into the LWPCS 10, which is a comprehensive closed-loop control system that controls the weld process, enables a system operator to monitor and, if necessary, intervene in the welding operation remotely from the operator station via the GUI 25, as well as provides real-time quality control and inspection during the weld process.

A weld initiation process 100 includes Steps 110–160. At Step 110 the operator starts up the LWPCS 10. At Step 120 specific data on the part to be welded is either entered into the CP 20 by the operator via the GUI 25 or fed by the external device 90 directly to the CP 20. The specific data include such parameters as: dimensional data on the parts to be welded; type of joint, e.g. T-joint, butt weld; type of material of parts; specifications on weld, e.g., width, depth, permissible undercut, etc. At Step 130, the CP 20 reads the specific data entered at Step 120 and selects from the database the corresponding initial process parameters that include: initial weld speed, MIG power, laser power, etc. At Step 140, the CP 20 initializes the STS 80. The STS 80 feeds joint data to the CP 20. At Step 150, the CP 20 feeds the initial weld parameters for the welding operation into the various subsystems: the LWPCS 10: the LDCS 30; the WPMPS 40; the AWQMS 50; the GMAW and WFCS 60; the ABDS 70; the STS 80, and, if applicable, the ESI 90. When all subsystems and their controls are operative and ready, the weld process is automatically initiated at Step 160.

Once the initiation process 100 is completed, a continuous weld process 300 with closed-loop control begins as illustrated with Steps 310–340. The closed-loop controls at Steps 310–340 serve to monitor the quality and accuracy of the weld during the weld process, thereby improving the quality of the weld and reducing the amount of rework required on a welded component subsequent to the weld process. Operator intervention, Step 200, is possible throughout the weld process. The operator may interrupt the weld process, introduce modifications to process parameters during the weld process, or may abort the process if the actual weld is beyond the limits of the control adjustments. During the continuous weld process 300, all subsystems 10, 30, 40, 50, 60, 70, 80, and, if applicable, 90, are controlled and regulated by the CP 20, which runs five different closed-loop control functions in parallel, monitoring for: operator intervention; active seam tracking control; adjustments to weld process parameters for any varying joint gap; adjustments to weld process parameters for any variations in either surface or internal weld quality; and determination of when the weld process is complete.

The STS 80 continuously measures and monitors the geometry of the joint to be welded. At Step 310, "Adjust Joint Position?" the CP 20 decides whether an adjustment of torch and laser focal position is needed, based on the data from STS 80. If the joint has moved away from the theoretical joint, as continuously measured by STS 80, motors are activated at Step 312 which cause the ABDS 70 to adjust the MIG torch and laser focal spot so that the MIG torch and laser focal position are maintained in the correct position relative to the joint. Should the necessary adjustments fall out of a predefined range, an error flag is generated and the weld process is terminated at Step 340.

Gap size is monitored by "Adjust for Gap?" closed-loop control at Step 320. For example, the edge of a part to be welded to another part may not always be perfectly flat or straight, depending on the method used to cut the part. As a result, when the two parts are brought together, areas of gap and no-gap may exist along the seam. At Step 320, gap data, which is part of the joint geometry measured by the STS 80, is fed to the CP 20; and the CP 20 decides whether adjustments to the weld parameters are needed. If an adjustment is necessary, the CP 20 uses the joint geometry data from STS 80 and the information in the parametric database to determine which weld parameters will be adjusted to compensate for the change in gap dimension at Step 322. At Step 324, the CP 20 makes the appropriate change to one or more weld process parameters, such as MIG voltage, wire feed speed, process speed, or laser power. As with the seam tracking operations, should the joint gap fall out of the permissible correction range, an error flag is generated and the weld process is terminated at Step 340.

Weld quality is measured during the weld process in real-time by the AWQMS 50 and WPMPS 40 and the data fed to the CP 20. Such measurements include fillet size, fillet geometry, undercut, concavity, convexity, undesirable trends, such as increasing fillet size or increasing undercut. Based on these measurements, the CP 20 determines at Step 330, "Weld Process OK?", whether unacceptable deviations are occurring in the weld quality. If the deviations are unacceptable and weld process parameters need to be adjusted, the CP 20, at Step 332, extracts the appropriate adjustment algorithm from the parametric database for one or more weld process parameters. At Step 334, the CP 20 adjusts the appropriate weld process parameters, such as MIG voltage, wire feed speed, process speed, or laser power. As with the seam tracking and gap correction routines, should the joint gap fall out of the permissible correction range, an error flag is generated and the weld process is terminated at Step 340.

The completion of the weld is monitored by "Weld Complete?" closed-loop control point at Step 340. The decision is normally based on the length parameter representing the length of the fabricated part that was entered at Step 120. In the case of a major fault with one of the other closed-loop control processes, such as gap correction, the error flag generated forces the "Weld Complete" decision to "yes." If the decision is "yes," the CP 20 initiates a stop sequence, which may include such steps as slowing down wire feed and welding laser speed, stopping wire feed and shutting off welding laser, and then shutting down the subsystems 30, 40, 50, 60, 70, 80, and, if applicable, 90, that control the weld process, as shown at Step 400.

An inspection report is generated at Step 500, after the stop process is completed. The report summarizes the quality of the weld and whether the part passes inspection or not. If the part does not pass inspection, all defects and their locations are flagged. The types of defects include insufficient fillet size, cracks, undercut, excessive concavity or convexity, etc. If the fabricated part passes inspection as determined at Step 510, the welded part is automatically moved into shipping as in Step 520. If the fabricated part does not pass inspection, at Step 530, it is sent elsewhere for offline manual reinspection or rework, depending on the nature of the defects.

It is understood that the embodiments described herein and in the claims are merely illustrative of the present invention. Variations in the particular controls and sensors may be contemplated by one skilled in the art without limiting the intended scope of the invention herein disclosed and as defined by the following claims.

What is claimed is:

1. A laser weld process control system comprising:
    a central processor that includes a parametric database with weld parameters and a graphical user interface (GUI) that enables operator input of weld specifications of a part to be welded and operation intervention in a weld process;
    a plurality of weld process subsystems that control said weld process by measuring and analyzing welding process-control parameters;
    a plurality of weld quality subsystems that monitor a weld quality of a weld seam in realtime during said weld process by measuring and analyzing weld-quality attributes of a weld during the welding process;
    wherein said central processer is in communication with each subsystem of said plurality of weld process subsystems and each subsystem of said plurality of weld quality subsystems, manages cross-communications between and among said each subsystem of said weld process subsystems and said weld quality subsystems, and provides closed-loop control of said weld process; and
    wherein said GUI provides a real-time representation of said weld parameters and a sequence of welding operations.

2. The laser weld process control system of claim 1, wherein said plurality of weld process subsystems includes a laser device control subsystem;
    GMAW and wire feed control subsystem; and
    wherein said weld process subsystems are directly controlled by said central processor.

3. A method of controlling a hybrid weld process, said method comprising:
    a) providing a central processor (CP) and a plurality of subsystems that includes device control subsystems such as a laser-weld-device control subsystem (LDCS), a GMAW subsystem (GMAW), a wire feed control subsystem (WFCS), and weld quality monitoring subsystems, such as a weld pool monitoring and processing subsystem (WPMPS), an active weld quality and monitoring subsystem (AWQMS), an adaptive laser-beam delivery subsystem (ABDS), and a seam tracker subsystem (STS);
    b) providing a database of weld parameters and adjustment parameters;

c) enabling communication from said CP to said each of said subsystems in said plurality of subsystems;
d) enabling communication from said weld quality monitoring subsystems with said CP;
e) enabling operator intervention via a graphic user interface (GUI);
f) automatically initializing a continuous weld process;
g) continuous real-time monitoring of said continuous weld process;
h) adjusting in real-time one or more devices in said device control subsystems, based on inputs from said plurality of subsystems, including from said WPMPS and said AWQMS; and
i) automatically generating an inspection report of a completed weld joint.

4. The method of claim 3, wherein said step of initializing said continuous weld operation includes the following steps:
f1) providing to said CP part-specific data for a part to be welded;
f2) selecting initial process-control parameters and weld quality parameters from said parametric database, based on said part-specific data;
f3) initializing seam tracking operations;
f4) initializing said device control subsystems; and
f5) initializing said weld quality monitoring subsystems.

5. The method of claim 4, wherein said step of initializing said device control subsystems includes initializing a laser beam delivery device; a GMAW device, and a wire feed device.

6. The method of claim 4, wherein said step of initializing said weld quality monitoring subsystems includes initializing said WPMPS, said AWQMS, said STS, and said ABDS.

7. The method of claim 3, wherein said step of continuous real-time monitoring of said continuous weld process includes the following steps:
g1) calculating a theoretical joint position, based on specific-part data;
g2) feeding actual joint position data to said CP;
g3) automatically calculating, based on algorithms in said parametric database, if beam delivery controls require adjustment.

8. The method of claim 7, wherein said step of determining if beam delivery controls require adjustment includes comparing said actual joint data with said theoretical joint position and, if requirement is necessary, said step of adjusting said one or more devices includes selecting an appropriate algorithm from said parametric database and sending signals from said CP to said ABDS to adjust beam delivery controls.

9. The method of claim 7, wherein said step of continuous real-time monitoring of said continuous weld process includes the following steps:
g4) feeding joint geometry data that includes a gap size and a gap location of said weld joint into said CP from said STS;
g5) comparing said joint geometry data with adjustment criteria in said parametric database;
g6) determining whether weld process parameters require adjustment.

10. The method of claim 9, wherein, when said step of determining whether said weld process parameters require adjustment indicates that an adjustment is required, said step of adjusting said one or more controls includes sending instructions from said CP to one or more of said device control subsystems to adjust one or more of said weld process parameters.

11. The method of claim 3, wherein said step of continuous real-time monitoring of said continuous weld process includes the following steps:
g7) feeding weld surface profile data from said AWQMS into said CP;
g8) automatically analyzing a weld quality of said weld joint; and
g9) determining if said weld quality is acceptable.

12. The method of claim 11, wherein said step of determining if said weld quality is acceptable includes receiving real-time data of an actual surface profile of said weld joint from said AWQMS, extracting data from said parametric database that provides a desirable surface profile of said weld joint, comparing said surface profile with said desirable surface profile, determining if said actual surface profile is within an acceptable range, and, if said actual surface profile is out of range, automatically extracting an appropriate surface profile adjustment algorithm from said parametric database, and adjusting one or more of said weld parameters.

13. The method of claim 3, wherein said step of continuous real-time monitoring of said continuous weld process includes the following steps:
g10) feeding weld pool data from said WPMPS to said CP; and
g11) analyzing said weld pool data and determining a weld integrity of said weld joint;
g12) comparing said weld integrity with values extracted from said parametric database; and
g13) determining whether, based on said weld integrity, one or more of said weld process parameters require adjustment.

14. The method of claim 3, wherein, if an adjustment to one or more of said weld process parameters is necessary during said weld process and said weld quality is determined to be unacceptable but reworkable, said step of automatically generating an inspection report of said completed weld joint includes the following steps:
h1) generating an error flag when an adjustment to one or more of said weld process parameters is required;
h2) indicating a type of defect;
h3) indicating a location of said defect; and
h4) indicating said adjustment made.

15. The method of claim 14, wherein, if said weld process parameters require adjustment, said step of controlling in real-time said continuous weld operation includes extracting an appropriate adjustment algorithm from said parametric database and adjusting one or more of said weld process parameter.

16. The method of claim 3, wherein, if said weld quality is determined to be unacceptable and not reworkable, said step of automatically generating an inspection report of said completed weld joint includes the following steps:
h5) instructing said weld device control subsystems to shut down;
h6) generating an error flag when an adjustment to one or more of said weld process parameters is required;
h7) indicating a type of defect;
h8) indicating a location of said defect; and
h9) indicating interruption of said weld process.

17. The laser weld process control system of claim 1, wherein said plurality of weld quality subsystems includes an active weld quality monitor subsystem (AWQMS) that measures said weld-quality attributes of said weld to determine if weld defects are present in said weld.

18. The laser weld process control system of claim 17, wherein said weld-quality attributes include data on a weld fillet size.

19. The laser weld process control system of claim 17, wherein said weld-quality attributes include data on the presence and size of weld undercut, weld crack, and weld porosity.

20. The laser weld process control system of claim 17, wherein said weld-quality attributes include data on fillet convexity or concavity.

21. The laser weld process control system of claim 17, wherein said AWQMS includes sensors for measuring joint location, including gap angle and mismatch.

22. The laser weld process control system of claim 1, said plurality of weld quality subsystems including a weld pool monitoring and processing subsystem (WPMPS) that monitors a weld pool.

23. The laser weld process control system of claim 22, wherein said WPMPS includes optical sensors for imaging said weld pool.

24. The laser weld process control system of claim 23, wherein said WPMPS acquires an image of said weld pool, and using image analysis routines, generates weld pool integrity data from said image and passes said weld pool integrity data to said central processor.

25. The laser weld process control system of claim 24, wherein said weld pool data includes subsurface weld information.

* * * * *